United States Patent [19]

Cervone et al.

[11] Patent Number: 4,774,517
[45] Date of Patent: Sep. 27, 1988

[54] VOLTAGE REGULATOR FOR USE IN TRANSMITTERS FOR RADAR APPLICATIONS

[75] Inventors: Piero Cervone; Ennio Giaccari; Roberto Pace, all of Rome, Italy

[73] Assignee: Selenia, Industrie Elettroniche Associate, S.p.A., Rome, Italy

[21] Appl. No.: 52,135

[22] Filed: May 18, 1987

Related U.S. Application Data

[63] Continuation of Ser. No. 834,305, Feb. 27, 1986, abandoned.

[30] Foreign Application Priority Data

Feb. 28, 1985 [IT] Italy ................. 47754 A/85

[51] Int. Cl.$^4$ ................................. G01S 7/28
[52] U.S. Cl. ................................. 342/202
[58] Field of Search .............. 342/82, 88, 175, 199, 342/202

[56] References Cited

U.S. PATENT DOCUMENTS

| | | | |
|---|---|---|---|
| 2,644,088 | 6/1953 | Cooper et al. | 342/202 |
| 3,298,025 | 1/1967 | Fumea, Jr. | 342/202 X |
| 3,740,640 | 6/1973 | Ravas et al. | 342/175 X |
| 4,097,863 | 6/1978 | Chambers | 342/175 |
| 4,104,564 | 8/1978 | Cohen et al. | 342/175 X |

*Primary Examiner*—Theodore M. Blum
*Assistant Examiner*—Bernarr Earl Gregory
*Attorney, Agent, or Firm*—Herbert Dubno

[57] ABSTRACT

Voltage regulator which can compensate for the output voltage variation of a line modulator for use in transmitters for radar applications. The voltage variation in question is due to the modulation induced by the radar repetition frequency. This regulator is essentially made up of a network (1,2,3,4,5,6,7) which varies the value of the input signal to a comparator 8 in relation to a signal which is proportional to the variation of repetition frequency.

1 Claim, 5 Drawing Sheets

VOLTAGE REGULATOR FOR USE IN TRANSMITTERS FOR RADAR APPLICATIONS

This is a continuation of co-pending application Ser. No. 834,305 filed on Feb. 27, 1986 now abandoned.

FIELD OF THE INVENTION

This invention relates to a voltage regulator which can be used to compensate for voltage variations at the output of a line modulator in a radar transmitter.

BACKGROUND OF THE INVENTION

A radar transmitter is required to provide high reproducibility of a transmitted waveform so that modifications of the echoes received, in terms of phase and amplitude, can be evaluated to ascertain characteristics of the target. To maintain the square wave amplitude and phase of the transmitted waveform constant in time requires high short term stability of the modulated signal, of the radio frequency source and the final amplification stage.

In general the power amplifier which is used is a cathode modulated power amplifier which has a video modulating pulse which is a function of time. For given power amplifier characteristics the stability transmitting system is greater when the pulse to pulse stability of the modulating signal $V_K(t)$ is stable.

At the receiver the processing system is usually of the MTI/MTD type so as to suppress fixed echoes and detect transient echoes characterized by Doppler frequencies different from zero.

Such systems require that the transmission rate vary from pulse to pulse or from pulse group to pulse group to an amount which, peak-to-peak may reach up to 20% of the mean value.

With very sophisticated modulators, transmission pulse instability can be limited to about 0.1% with acceptable circuit complications, greater stability generally involving unacceptable circuit complications.

Through the use of good power transmitting tubes and modulators with these characteristics, it is possible to assure a degree of stability of the characteristics of the RF pulses transmitted so as to achieve typically the capability of suppressing fixed echoes at about 40 dB.

This value is about 10 dB less than what can be achieved if greater stability can be ensured with other elements of the transmitting and receiving chains.

OBJECTS OF THE INVENTION

It is the principal object of the present invention to improve upon the stability of a radar system and particularly the transmitting stability thereof by providing an improved voltage regulator which allows overall improvements in the stability of the modulating signal $V_K(t)$.

Another object of this invention is to provide an improved voltage regulator for a radar transmitter.

SUMMARY OF THE INVENTION

These objects are attained, in accordance with the present invention in a device for voltage regulation in a radar transmitter which comprises a set/reset circuit for generating a square wave having a first period equal to charging time of a pulse forming network and a second period equal to a pulsed radio frequency, an integration network having a time constant equal to that of the power supply feature of a high voltage power supply feeding the modulator of the transmitter which, in turn, feeds a power amplifier also supplied with an input from a radio frequency generator, and a switch to ground coupled between the set/reset circuit and the integrating network for discharging the integrating network during the first period and charging the integrating network during the second period; a peak detector is coupled to the integration network for generating a signal which varies proportionally with the pulsed radio frequency and an amplifier of the voltage regulator is connected between the peak detector and, advantageously, a buffer at the output thereof, and a summing network or circuit for summing the output of the amplifier with a reference signal which is updated.

A comparison circuit is coupled to the summing circuit and to a high voltage divider which forms part of the modulator and power supply circuit which together form a resonant discharge module outputting the aforementioned signal $V_K(t)$ to the power amplifier.

The comparator, in turn, feeds a synchronizing generator which outputs a signal when the comparison is zero to operate the set/reset circuit and, through a pilot circuit coupled to the synchronizing generator for blocking charging of the pulse forming network upon receipt of the synchronism signal.

The circuit of the invention has been found to effectively stabilize signals delivered by the high voltage power supply to the pulse forming network and hence the output signal $V_K(t)$.

BRIEF DESCRIPTION OF THE INVENTION

In the drawing

SPECIFIC DESCRIPTION

Figure 1:
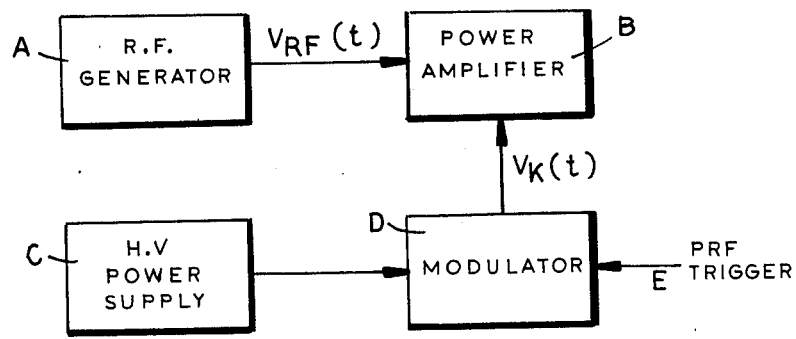
FIG. 1 is a block diagram of a radar transmitter with which the circuit of the invention can be used.

From FIG. 1, it will be apparent that a radar transmission pulse can be generated by feeding a voltage from a high voltage power supply C to a modulator D which outputs the basic transmission pulse $V_K(t)$ at a repetition determined by the input at E.

The output $V_K(t)$ is applied to a power amplifier B, also receiving a radio frequency input $V_{RF}(t)$ from a radio frequency generator A and, as is usually the case, outputting its signal to an antenna.

Figure 4:
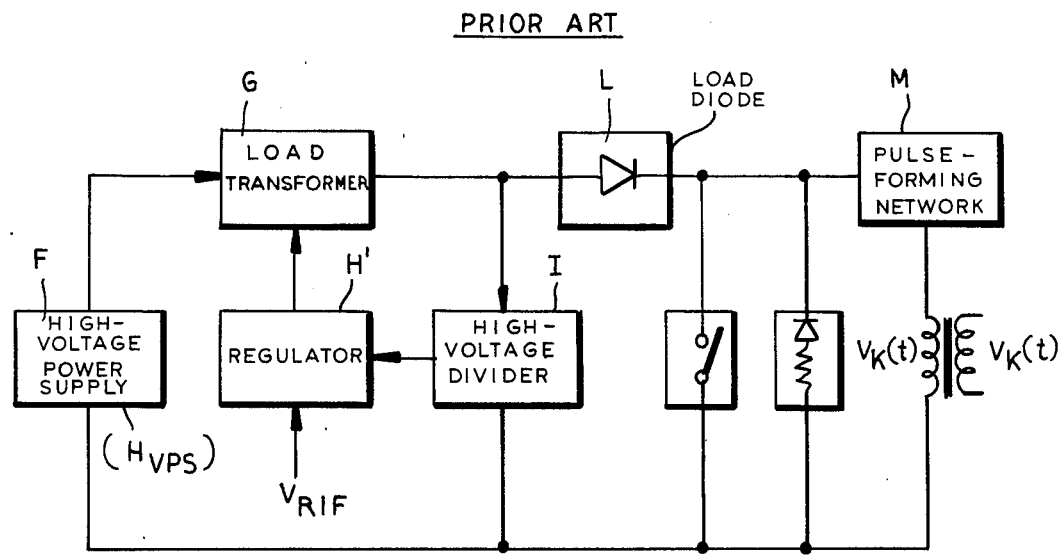
FIG. 4 is a schematic drawing of a resonant discharge modulator and a high voltage power supply which has been equipped with a regulator, it being understood that the regulator of FIG. 2 is, in accordance with the invention, substituted for the regulator here shown.

The high voltage power supply C and the modulator can be coupled in a network whose configuration is generally known and has been illustrated in FIG. 4 to form a resonant discharge modulator.

Here the high voltage power supply is shown at F and feeds through a load transformer G, the output of the latter being applied through the load diode L to the pulse forming network M which can be coupled to the output of the modulator through a transformer at whose output, the signal $V_K(t)$ is seen.

Figure 2:
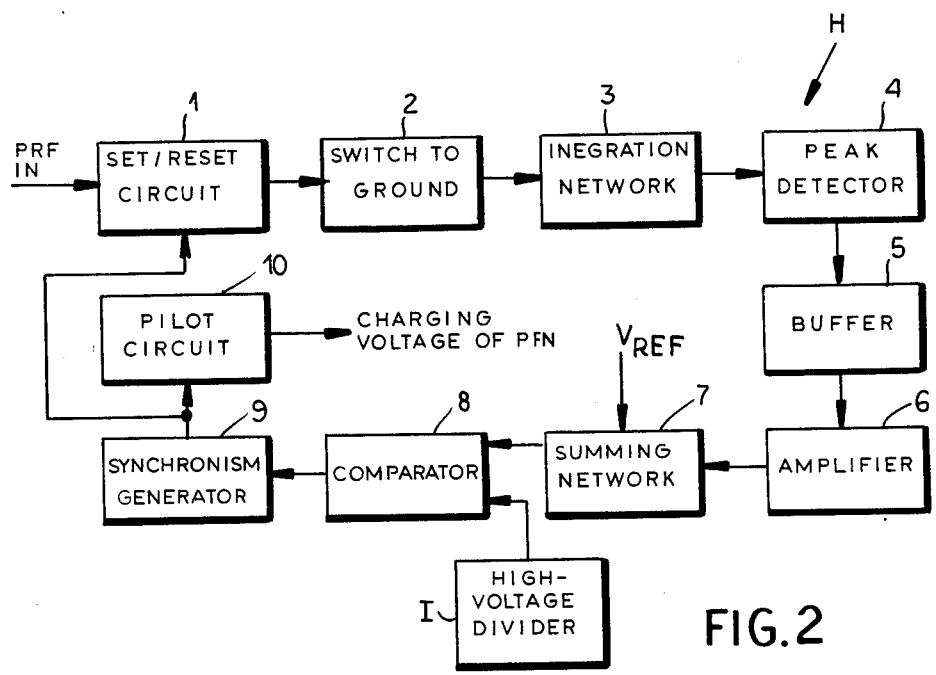
FIG. 2 is a block diagram of the voltage regulator of the invention.

A high voltage divider I provides the feedback input to the comparator of a regulator which is represented at H' but which, in accordance with the invention, may be of the form shown in FIG. 2.

The reference voltage input $V_{REF}$ is likewise shown in FIG. 4 to be applied to the regulator.

The regulator H of the invention is best seen in FIG. 2 and comprises a set/reset circuit 1 receiving current at its input at the pulse repetition frequency (PRF).

This circuit is connected to a switch to ground 2 which, in turn, allows charging and discharging of an integrating network 3 whose output is applied through a peak detector 4 to a buffer 5 and then to amplifier 6.

The amplifier output is applied to a summing network 7 whose other input is the reference voltage $V_{REF}$.

The output of the summing network 7 is applied as one input to a comparator 8 whose other input derives from the high voltage divider I.

The output of the comparator is applied to the synchronization generator 9 which controls the set/reset circuit 1 and a pilot circuit 10 regulating the charging voltage of the pulse forming network N through its action on the load transformer G (FIG. 4).

Figure 3:
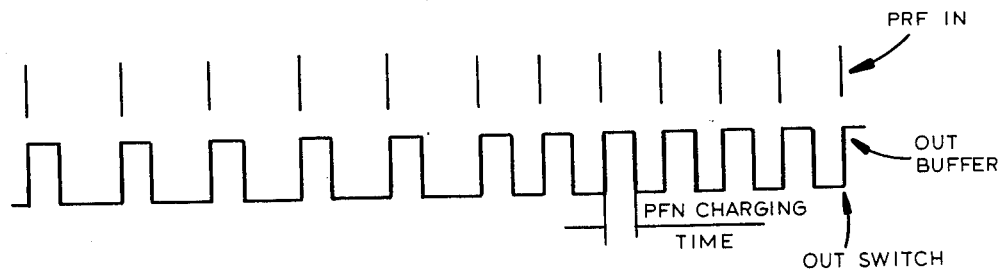
FIG. 3 is a pulse diagram illustrating the square wave output of such a transmitter and its relationship to the radar frequency.

The output of the set/reset circuit has been shown in FIG. 3. The latter device generates a square wave having level 1 and a duration equal to the PFN charge time and a zero level such that the duration 1 plus 0 is equal to the period of the radar frequency. The PRF cadence setting pulses, represented at PRF IN have also been shown in FIG. 3.

Thus the level is piloted by the radar PRF while the reset trigger is generated by the comparison output which compares the PFN charge voltage (from the divider I) with a reference voltage generated in the summing amplifier 7.

This square wave output shown in FIG. 3 from the set/reset circuit pilots the switch to which discharges the integrating network 3 for a duration proportional to that of PFN charge and charges the integrator over the full duration elapsing between each regulating point and the next radar pulse. The integration network time constant is made equal to that of the high voltage power supply, i.e. the filter thereof.

The peak detector 4 responds to the ripple peak value and provides a signal whose amplitude is proportional to the radar pulse repetition frequency PRF.

This signal is passed through the buffer 5, is amplified and inverted in the amplifier 6 and is fed to the summing network 7.

The signal from the amplifier 6 is summed in network 7 with a reference voltage $V_{REF}$ which is corrected by a signal which updates pulse by pulse the comparison point for the high voltage divider.

The reference output from the summing network 7 is compared, in the comparator 8 with a voltage representing the high voltage charging input to the pulse forming network N but outputted by the high voltage divider I.

When the comparator output is zero, a synchronism signal is generated by the synchronizing trigger generator 9.

This synchronizing pulse blocks, through the pilot circuit or driver 10 a charge voltage for the PFN. It also resets circuit 1.

The advantage of the specific voltage regulator circuit shown is that it can operate entirely at low voltages with simple signal manipulation to control the very high voltages between the high voltage source and the pulse forming network of the modulator. It is also significant because it is adaptive to the transmission PRF.

Utilizing the voltage regulator of the invention, we have been able to reach stabilities such that deviation is limited to the order of 0.0.%, allowing suppression of fixed echoes of the order of 60 dB and with an improvement of 10 dB over systems without the arrangement described.

Figure 6:
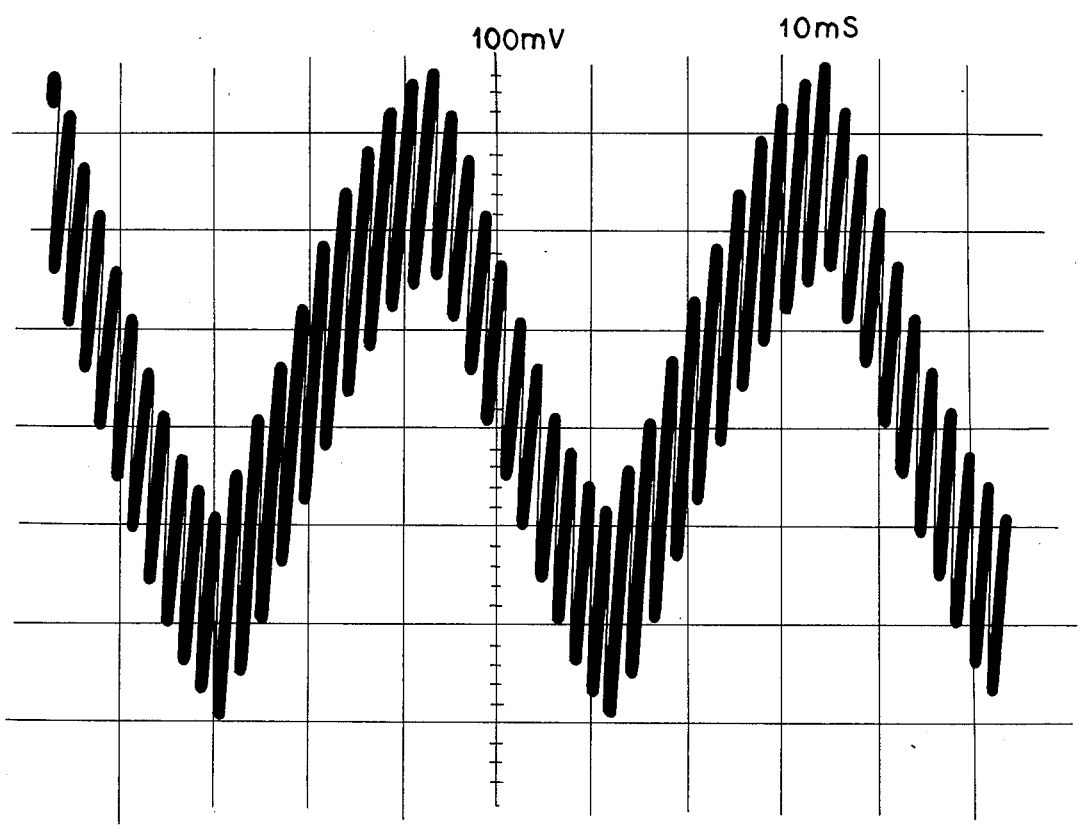
FIG. 6 is an oscilloscope depiction of the ripple at the power supply with pulse repetition frequency (PRF) varying every 10 pulses.
Figure 7:
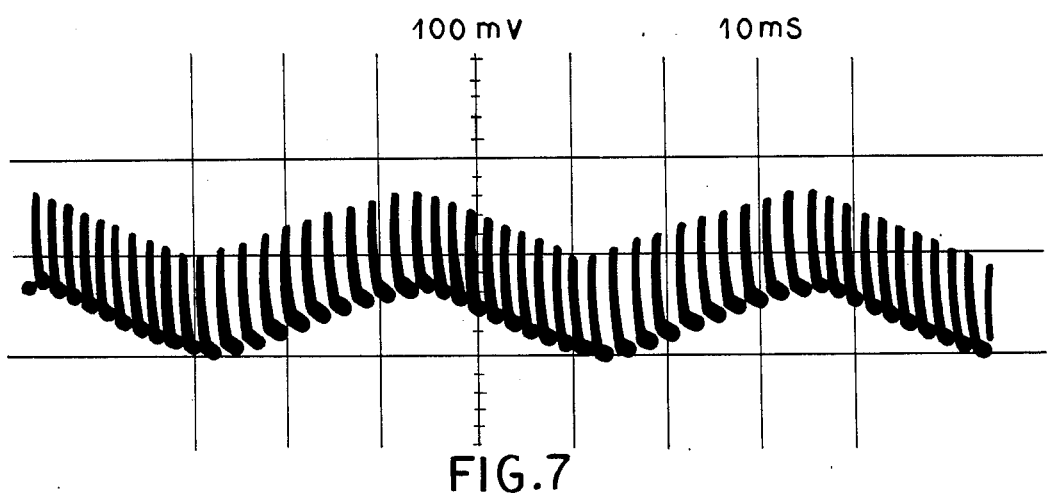
FIG. 7 is an oscilloscope display of the ripple at the output of the pulse forming network (PFN)
Figure 8:
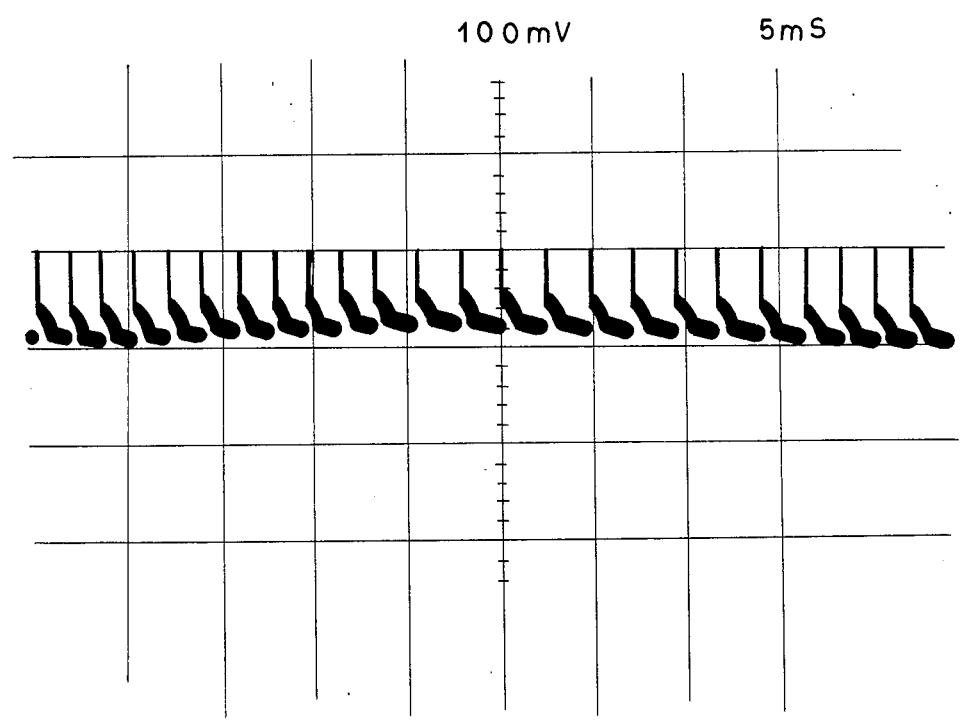
FIG. 8 is an oscilliscope depiction of the effect of the stabilizing circuit of the invention and can be compared with FIG. 7.

The effect of the circuit illustrated in FIG. 2 on the transmitter of FIGS. 1 and 4 can be understood from FIGS. 6-8 which relate to comparative results.

Figure 5:
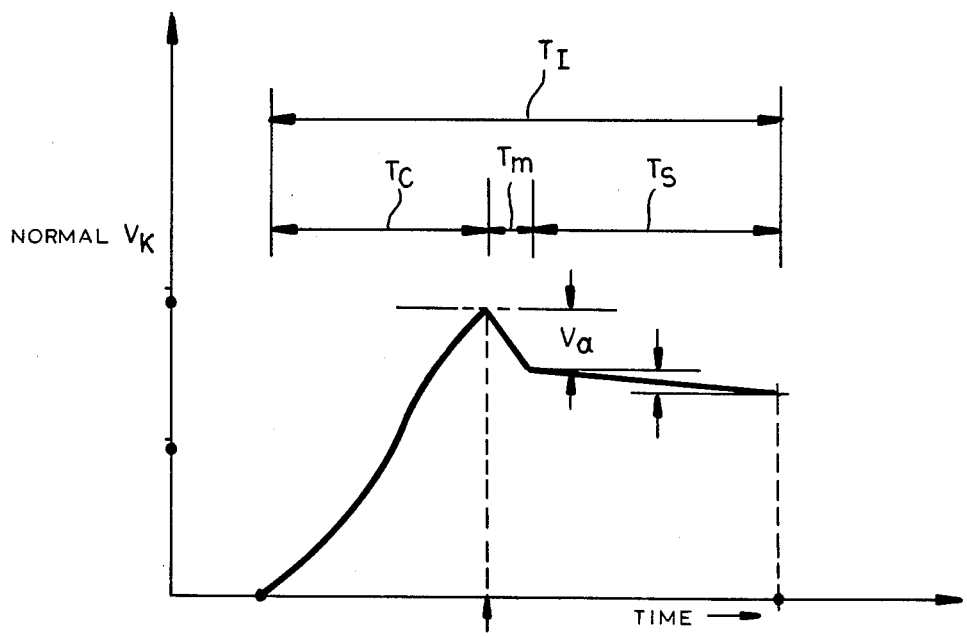
FIG. 5 is a graph showing the time function of the voltage at the output of the pulse forming network.

As can be seen firstly from FIG. 5 in which the time function of the voltage $V_K(t)$ at the output of the pulse forming network normalized with respect to the average voltage of the power supply is plotted against time, the high voltage is applied to a load which varies sharply with the radar repetition period.

At the power supply output, in addition to the line curent ripple at line frequency, a load ripple having the same repetition frequency as the PRF will develop (FIG. 6).

These ripples have a range of effects upon the pulse forming network but when PRF is constant, the dominant effect is load ripple and where PRF is not constant, even the load ripple effect will change and the result will be a modification of the pulse production rate, which can be described as transmission pulse staggering.

The end result is that the output voltage of the power supply is not only affected by the supply ripple, but is also affected by a load ripple with a stagger frequency on which is superimposed a further ripple at the pulse repetition frequency. FIG. 6, therefore, shows the ripple variation at the power supply output for a transmission rate which has either of two values, charging at every group of 10 pulses.

Since the power supply ripple is fed ultimately to the pulse forming network (PFN)M, the ripple at this network is likewise pronounced and has been shown in FIG. 7.

With the system of the invention, the stagger contribution to the ripple effect is eliminated as a comparison of FIGS. 7 and 8 will show, FIG. 8 representing the signal between the pulse forming network N when the regulator circuit of the invention is used.

The device of the invention is also capable of compensating for the usual line current ripple when the integration time network constant is equal to that of the high voltage power supply filter.

We claim:

1. A device for voltage regulation for a radar system having a pulsed radar frequency to compensate for voltage variations in a resonant discharge module having a pulse forming network and a high voltage divider connected to a high voltage power supply with a high voltage power supply filter, such that said device is capable of generating a signal adapted to be used in said resonant discharge module for radar transmitters, said device comprising:

- a set/reset circuit for generating a square wave having a first period equal to a charging time of said pulse forming network and a second period equal to that of the pulsed radio frequency;
- an integration network having a time constant equal to that of the high voltage power supply filter;
- a switch to ground coupled to said set/reset circuit and coupled to an integration network for discharging said integration network during said first period and charging said integration network during said second period;
- a peak detector coupled to said integration network for generating an output signal with an amplitude which varies proportionally with said pulsed radio frequency;
- an amplifier coupled to said peak detector for amplifying the output signal of said peak detector and producing an output corresponding to the amplified output signal of said peak detector;
- a summing circuit for summing said output of said amplifier with a reference signal forming an updated reference signal;
- a comparison circuit coupled to said summing circuit and said high voltage divider;
- a synchronizing generator coupled to said comparison circuit whereby, if an output of said comparison circuit is zero, said synchronizing generator generates a synchronizing signal; and
- a pilot circuit coupled to said synchronizing generator and coupled to said pulse forming network for blocking charging of said pulse forming network upon receipt of said synchronizing signal.

* * * * *